United States Patent [19]
Shioya et al.

[11] Patent Number: 6,088,244
[45] Date of Patent: Jul. 11, 2000

[54] SWITCHING POWER SUPPLY USING A SINGLE ISOLATING ELEMENT TO FACILITATE MULTIPLE FUNCTIONS

[75] Inventors: Masaki Shioya; Hideaki Matsumura; Takumi Oe; Iwao Nakanishi, all of Tokyo, Japan

[73] Assignee: Yokogawa Electric Corp., Tokyo, Japan

[21] Appl. No.: 09/437,514

[22] Filed: Nov. 10, 1999

[30] Foreign Application Priority Data

Nov. 19, 1998 [JP] Japan .................................. 10-329480

[51] Int. Cl.[7] .................................................. H02M 3/335
[52] U.S. Cl. .................................. 363/21; 323/902; 363/97
[58] Field of Search .......................... 363/21, 97; 323/902

[56] References Cited

U.S. PATENT DOCUMENTS

| | | | |
|---|---|---|---|
| 5,640,312 | 6/1997 | Carroll | 363/21 |
| 5,818,670 | 10/1998 | Ahn | 363/21 |
| 5,914,865 | 6/1999 | Barbehenn et al. | 363/21 |
| 6,005,789 | 12/1999 | Lee | 363/95 |

*Primary Examiner*—Peter S. Wong
*Assistant Examiner*—Gary L. Laxton
*Attorney, Agent, or Firm*—Moonray Kojima

[57] ABSTRACT

A switching power supply comprising a main converter that turns ON and OFF a DC current applied to a primary winding of a main transformer by a main switching element and outputs a main output voltage to a secondary circuit by rectifying and smoothing current induced in a secondary winding; an error amplifier generating an error voltage between the main output voltage and a first reference voltage; an over-voltage protection circuit that generates an over-voltage protection signal when the main output voltage exceeds a second reference voltage; a PWM circuit to control a drive signal for the main switching element to minimize error voltage outputted by the error amplifier; and a shut-down execution circuit that stops the main converter operation when the over-voltage protection signal is generated; wherein are provided a device to superimpose the over-voltage protection signal on the error signal of the main output voltage induced in the secondary winding and to transmit the superimposed signal to the primary circuit after isolating the superimposed signal with a photo-coupler; and a primary control circuit that detects an error signal transmitted via the photo-coupler by dividing the error signal into three levels of stop range, normal operation range, and abnormal operation range, and rapidly stop operation of the main converter when the error signal value is deflected to the stop range or the abnormal operation range due to failure of the photo-coupler, thereby resulting in improved reliability of the switching power supply.

7 Claims, 5 Drawing Sheets

(PRIOR ART) FIG. 1

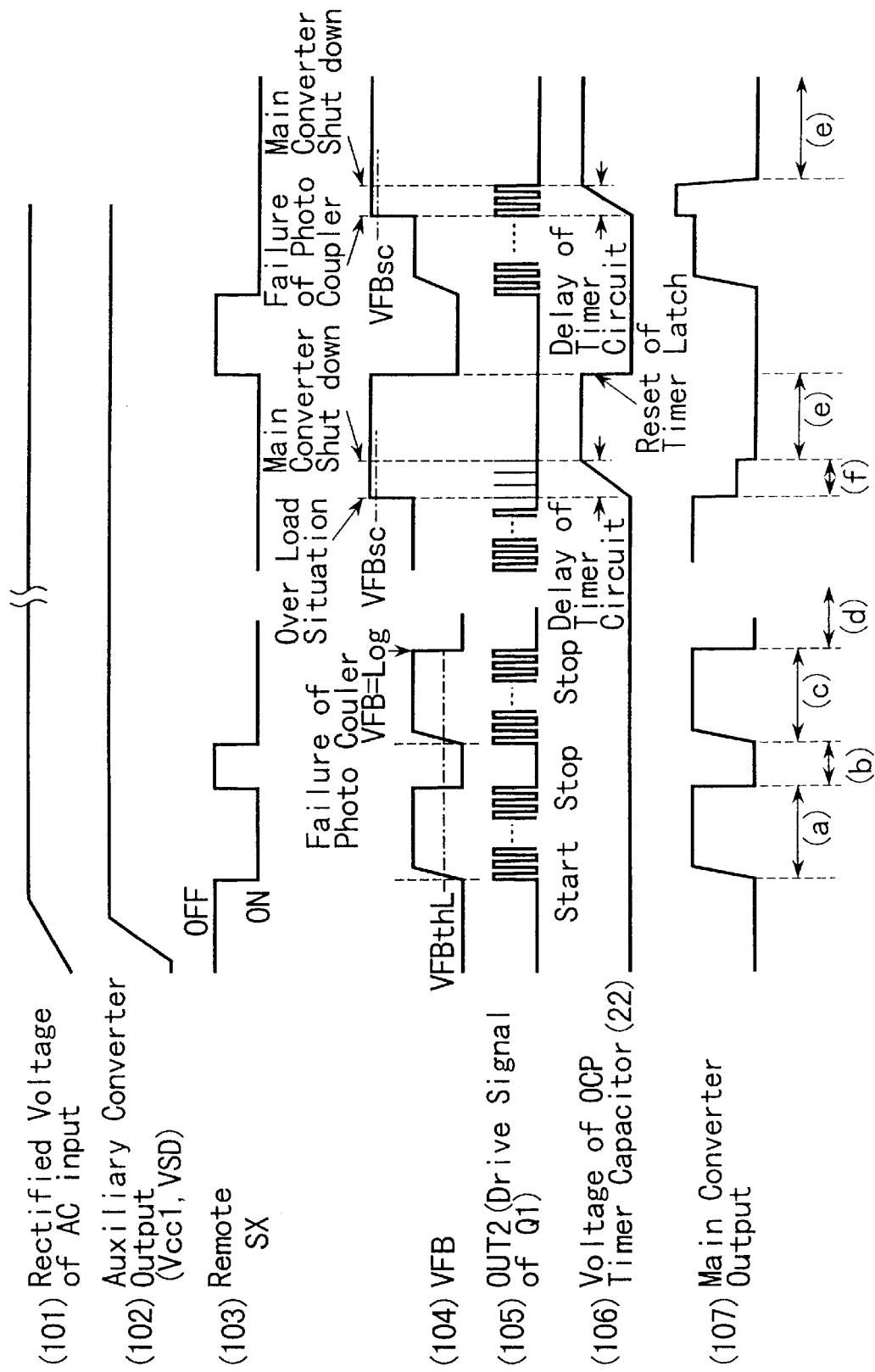

SWITCHING POWER SUPPLY USING A SINGLE ISOLATING ELEMENT TO FACILITATE MULTIPLE FUNCTIONS

BACKGROUND OF THE INVENTION

1. Field of Invention

This invention relates to a switching power supply used, for example, in electronic equipment, such as computers; and more particularly, to such power supply that can start or stop a primary switching element thereof by using a start or stop signal from a secondary circuit, or by using a command from an over-voltage protection circuit.

2. Description of the Prior Art

Generally, in conventional switching power supplies, two or three isolators are used to isolate a feedback signal for output voltage stabilization, to isolate the signal from an over-voltage protection circuit for the output voltage, and to isolate a remote control signal for turning ON and OFF power with a secondary external switch. In such power supplies, photo-couplers or transformers are used as the isolators. For example, in Japan Published Unexamined UM application HEI 1-79,389, a remote control signal and an over-voltage protection signal are isolated using only one isolator. However, since the isolator is separately provided, to isolate the feedback signal for out-put voltage stabilization, two or more isolators are used for the entire power supply. In such a case, a problem arises in that the number and cost of components are increased. Another problem is that if isolation is intended between the primary and secondary circuits, using photo-couplers or transformers complicates the design of printed wiring boards because of creepage distances and clearances due to limitations in various standards, such as safety standards, must be taken into consideration.

In Japan Published Unexamined Patent application Hei 4-156,270 a power supply is disclosed using one isolator to isolate three types of signals. However, this power supply has a problem in that since the latch circuit for over-voltage protection is included in the primary circuit, it is in possible to release the latch and restart the power supply using a remote control signal. Also, another problem is that the commercial power line voltage must be turned OFF to release the latch. Thus, the turning OFF procedure cannot be applied to some types of applications of the power supply. In order to solve these problems, a switching power supply having the circuitry shown in FIG. 1 was proposed.

In FIG. 1, main converter 10 outputs main output voltage Vo to a secondary circuit by turning ON and OFF a DC current applied to the primary winding n1 of the main transformer T1 using main switching element Q1 and rectifying and smoothing the current induced in the secondary winding n2. Since a commercial AC power line is used as an input source in the power supply, DC input voltage Vidc is obtained by rectifying and smoothing the input by using diode bridge DB and capacitor C1. Although an FET (field effect transistor) is used for the main switching element Q1, either a PNP or NPN transistor can also be used. As the secondary rectifying and smoothing circuit, the anode terminals of diodes D1 and D2 are connected to each end of secondary winding n2, respectively, and the cathode terminals of both diodes are short circuited and connected to output capacitor C2.

Error amplifier 20 generates an error voltage between main output voltage Vo and first reference voltagae Vref1 and, in this case, uses operational amplifier U1. Main output voltage Vo is divided in a suitable table ratio using dividing resistors R1 and R2, and sent to error amplifier 20. PWM (Pulse Width Modulation) circuit 30 outputs a drive signal for the main switching element to minimize an error voltage outputted by error amplifier 20, and uses, in this case, a PWM control circuit U2. Auxiliary converter 40 turns ON and OFF the DC current applied to primary winding n3 of auxiliary transformer T2 using auxiliary switching element Q2. The current induced in secondary winding n4 of the primary circuit is outputted as auxiliary voltage Vcc1 for PWM circuit 30 via the rectifying and smoothing circuit comprising diode D4 and capacitor C4. The current induced in the secondary winding n5 of the secondary circuit is outputted as secondary auxiliary voltage Vcc2 via the rectifying and smoothing circuit comprising diode D3 and capacitor C3.

Photo-coupler PC receives an error voltage outputted from the error amplifier 20 as an input signal on the light emission diode side and outputs an output signal from the photo transistor detector to the PWM circuit 30. Over-voltage protection circuit 50 generates an over-voltage protection signal when main output voltage Vo exceeds the second reference voltage Vref2, and uses, in this case, operational amplifier U3. Since main output voltage Vo is grounded through a series circuit comprising Zener diode D5 and resistor R4, the voltage generated across resistor R4 is inputted to the positive terminal of operational amplifier U3.

Power ON/OFF circuit 60 outputs either secondary auxiliary voltage Vcc2 or the common potential depending on the remote control signal sent from the secondary circuit. In this case, operational amplifier U4 receives a potential at the terminal of resistor R5, on the switch SW1 side, as an input signal, at its positive terminal and also receives third reference voltage Vref3, as an input signal, at the negative terminal. Operational amplifier U4 outputs a high (H) or low (L) level signal corresponding to the remote control signal ON or OFF. Switch SW1 comprises a contact switch or a TTL circuit and defines the ON and OFf status of the remote control signal. When the remote control signal is ON, switch SW1 is closed and as a result the output of operational amplifier U4 is changed to L.

Shut-down latch circuit 70 receives the over-voltage protection signal from over-voltage protection circuit 50, at the set terminal thereof as an input signal, and receives the remote control signal from power ON/OFF circuit 60, at the reset terminal thereof as another input signal. Shut-down latch circuit 70 outputs the shut-down signal from the output terminal thereof. In this case, the shut down latch 70 comprises an RS flip-flop U5. Shut-down execution circuit 80 retains the input voltage for photo-coupler PC at a low level (L) when either of the remote control signal from power ON/OFF circuit 60 and the shut-down signal from the shut-down latch circuit 70 indicates power OFF.

In shut-down execution circuit 80, the output signal from operational amplifier U4 and the output signal from shut-down latch circuit 70 are inputted to OR circuit U6 and an output signal from OR circuit U6 turns ON and OFF switch SW2. When switch SW2 is turned ON, input voltage VPD of photo-coupler PC is maintained at state L. When switch SW2 is turned OFF, the input voltage VPD of the photo-coupler PC is equal to the output voltage E/AOUT from error amplifier 20.

Operation of the FIG. 1 circuit will be described with reference to the waveform chart of FIG. 2, wherein line (A) shows remote control signal ON and OFF; line (B) show the output from the shut-down latch circuit 70; line (C) shows the input voltage VPD and the output voltage VFB of the photo-coupler; line (D) shows the main switching element Q1 driving signal outputted from the PWM circuit; and line (E) shows the main output voltage Vo. Auxiliary converter 40 is always operating regardless of whether the remote control signal is ON or OFF as long as the commercial power AC voltage in supplied to the circuit. It is assumed that auxiliary converter 40 is already started by turning ON the commercial power AC voltage and the PWM circuit 30 driving voltage Vcc1 and the driving voltage Vcc2 for the secondary control circuit are supplied in a stable manner.

At time T1, the remote control signal changes from an OFF state (high level H) to an ON state (low level L). Then, the output signal from operational amplifier U4, in power ON/OFF circuit 60, changes to a low state L and switch SW2 is opened. Then, the output voltage from operational amplifier U1 of error amplifier 20 is supplied as an input signal voltage VPD to the photo-coupler PC. On the other hand, when the output voltage VFB of the photocoupler is equal to or less than the predetermined threshold voltage Vth, the PWM circuit 30 does not output pulses from the OUT terminal thereof. As the output voltage VFB becomes higher than the threshold voltage Vth, PWM circuit operates so that the duty ratio thereof of the ON and OFF states becomes large. Thus, when error voltage signal E/AOUT of error amplifier 20 starts to be transmitted from the photo-coupler PC, emitter voltage VFB of the photo transistor detector rises from 0 volts. When VFB exceeds threshold voltage Vth, the driving signal for the main switching element Q1 is outputted from the OUT terminal of the PWM circuit. Then, main converter 10 starts operation, and the main voltage Vo begins to rise.

In addition, in FIG. 2, the input voltage VPD and output voltage VFB of the photocoupler PC and main output voltage Vo rise with a slope, respectively. This is because mounting of a so-called slow start circuit is considered in the secondary circuit. That is, although the rush current is prevented from occuring when the slow start circuit is provided, error voltage signal E/AOUT from error amplifier 20 increases gradually at the time of start up.

Next, when the remote control signal is turned OFF at time T2, the output signal from operational amplifier U4 of power ON/OFF circuit 60 is changed to a high state H and switch SW2 is closed to clamp input voltage VPD from the photo-coupler to a low state L. Then, since the output voltage VFB from the photo-coupler drops to the predetermined threshold voltage Vth or less, the duty ratio of the ON state of the main switching element Q1 driving signal outputted from the OUT terminal of the PWM circuit 30 becomes zero to stop the operation of the main converter 10.

Next, assume that an over-voltage is generated in the main output voltage Vo at time T3. Then, over-voltage protection circuit 50 detects the over-voltage and sets shut-down latch circuit 70. This clamps input voltage VPD of the photo-coupler to a low state L, and stops operation of the main converter 10 until the shut-down latch circuit 70 is reset. While the main converter 10 is in a non-operated state, the defect that caused the over-voltage is removed.

When the remote control signal is turned OFF at time T4, the out-put signal from the operational amplifier U4 in power ON/OFF circuit 60 is changed to a high state H, and shut-down circuit 70 is reset. After that, when the remote control signal is turned ON at time T5, the main converter 10 is restarted.

Since an over-voltage protection signal and a remote control signal are superimposed on the feedback signal of the output voltage, only one photo-coupler, that is the isolator, is required. Thus, the conventional switching power supply shown in FIG. 1 has the advantage of low cost, and good reliability. However, the FIG. 1 system also has the following problems. The feedback signal of the output voltage, which is obtained by superimposing an over-voltage protection signal on a remote control signal, is transmitted to the primary circuit by use of only one photo-coupler. Thus, if an abnormal status, such as increase in output signal due to a failure in the photo-coupler, the conventional power supply cannot be stopped and an over-voltage could continue to be supplied to the load.

SUMMARY OF THE INVENTION

Accordingly, an object of the invention is to overcome the aforementioned and other deficiencies and disadvantages of the prior art.

Another object is to provide a switching power supply that has improved reliability and can perform output control, start up and shut down, and protective operations from a secondary circuit using only one isolating element, and furthermore, can safely stop operation of the power supply even when a component fails, such as failure of the isolator element.

BRIEF DESCRIPTION OF THE DRAWINGS

FIG. 5 is a waveform diagram depicting operation of the embodiment of FIG. 1.

DESCRIPTION OF THE PREFERRED EMBODIMENTS

Figure 1:
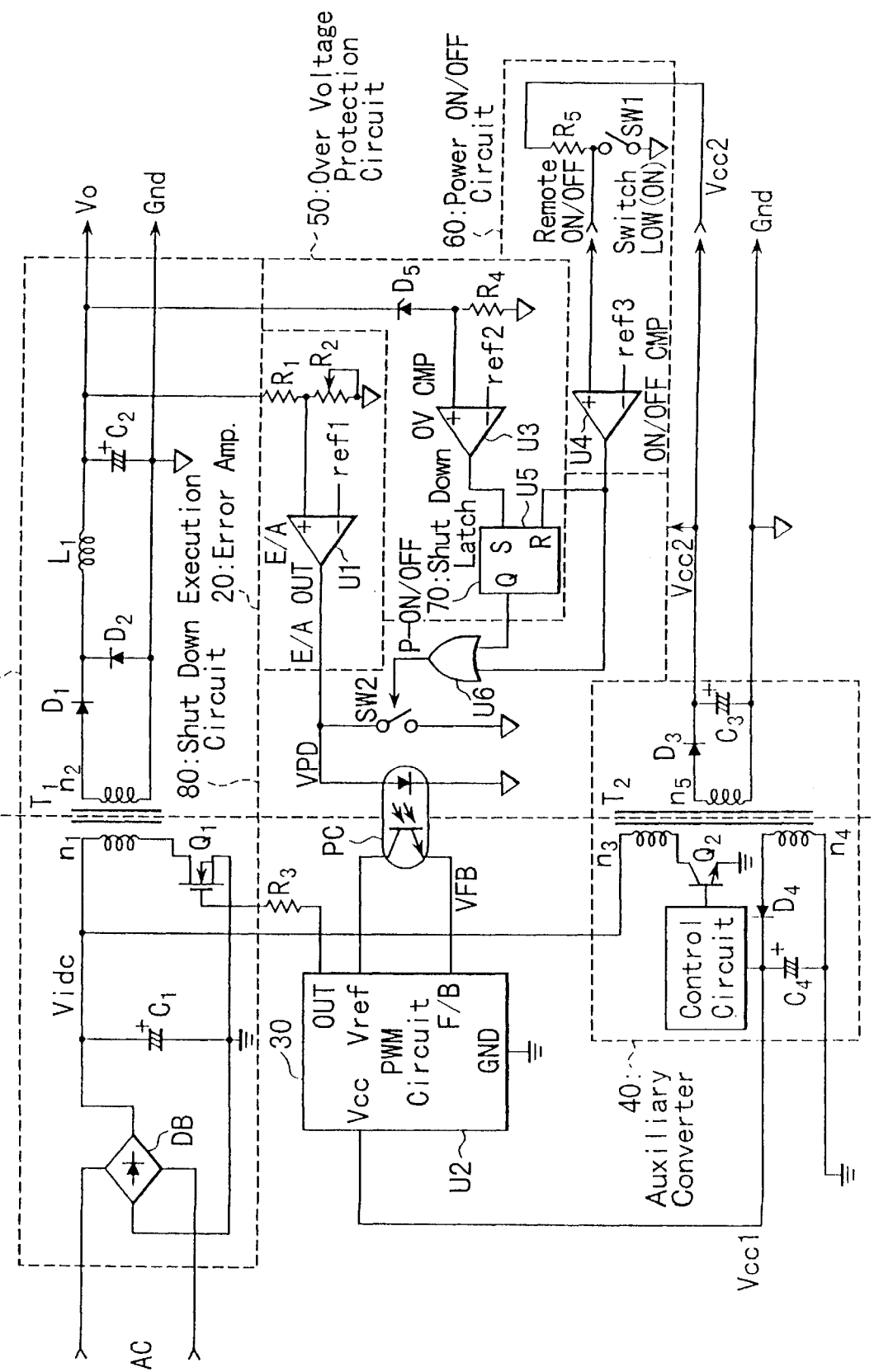
FIG. 1 is a schematic drawing depicting a conventional switching power supply.
Figure 2:
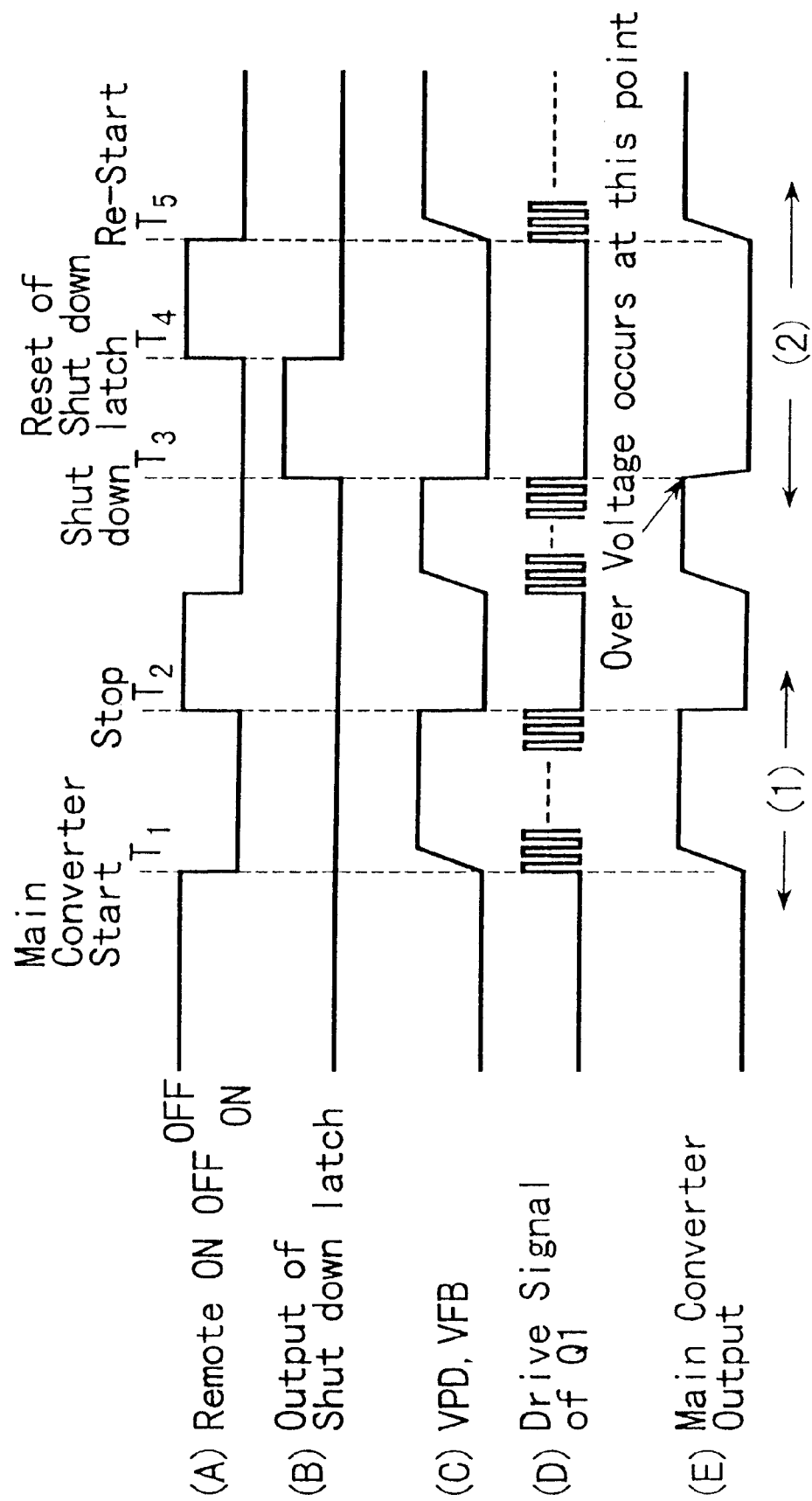
FIG. 2 is a waveform diagram depicting operation of the power supply of FIG. 1.
Figure 3:
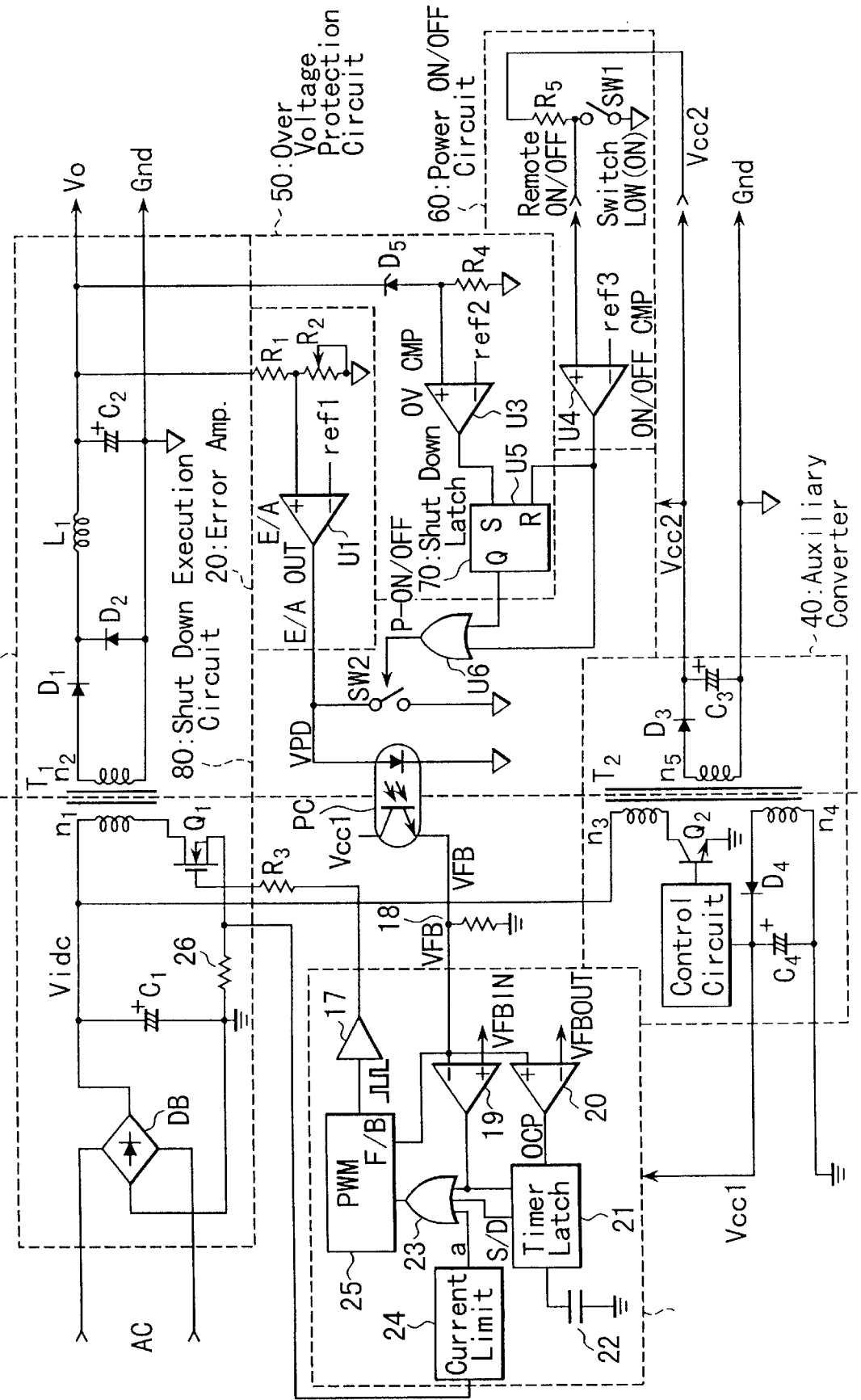
FIG. 3 is a schematic drawing depicting an illustrative embodiment of the invention.

In FIG. 3, the components which are the same as those in FIG. 1 bear the same identifying symbols, and will not be discussed further hereat for sake of clarity of description. The difference between the embodiment of FIG. 3 and the conventional system of FIG. 1 is that in the embodiment of FIG. 3, there is further provided a primary control circuit 100.

The feedback signal VFB transmitted to the primary circuit via photo-coupler PC from the secondary circuit is converted to a voltage by resistor 18 and is inputted to the negative terminal of comparator 19, the positive terminal of comparator 20, and PWM circuit 25. PWM circuit 25 outputs a signal, which serves as switching element Q1 ON/OFF signal OUT1 determined by the value of the feedback signal VFB, to driver 17 to control the switching time of switching element Q1. Driver 17 is a driver to output the driving signal OUT2 of switching element Q1 corresponding to the ON/OFF signal OUT1. In addition, PWM circuit 25 stops the ON/OFF signal OUT1 when the input signal to the reset terminal thereof is changed to a high state H. Hereinafter, the signal inputted to the reset terminal will be called "operation stop or stopping signal".

Auxiliary converter 40 turns ON and OFF the DC current applied to the primary winding n3 of auxiliary transformer T2 by use of auxiliary switching element Q2. The current induced in the secondary winding n4 of the primary circuit is outputted as auxiliary voltage Vcc1 for operating the primary control circuit 100 after passing through a rectifying and smoothing circuit comprising diode D4 and capacitor C4. The current induced in secondary winding n5 of the secondary circuit is outputted as secondary auxiliary voltage Vcc2 after passing through a rectifying and smoothing circuit comprising diode D3 and capacitor C3.

Comparator 19 receives a low threshold voltage VFBthL at the positive terminal thereof, as an input signal, and changes the control stopping signal STP to a high state H when the feedback signal VFB becomes lower than the low threshold voltage VFBthL. Comparator 20 receives a high threshold voltage VFBoc at the negative terminal thereof as an input signal and changes an anomaly stopping signal OCP to a high state H when the feedback signal VFB exceeds the high threshold voltage VFBoc.

Timer latch circuit 21 charges timer capacitor 22 when the anamoly stop or stopping signal OCP, generated by comparator 20, is changed to a high state H, and latches primary shut-down signal S/D, the output signal, when the voltage across the timer capacitor 22 exceeds a specified value. In addition, timer circuit 21 receives the control stop or stopping signal STP at the reset terminal thereof as an input signal and when signal STP is changed to a high state H, releases the latch and changes the primary shut-down signal S/D to a low state L.

Current limiting circuit 24 changes the output signal to a high state H when the current to the switching element Q1, detected by detection resistor 26, exceeds a specified value. OR circuit 23 receives the anamoly stop or stopping signal OCP, the primary shut-down signal S/D, and the output signal CL, as input signals. When any one of these signals is changed to a high state H, OR circuit 23 changes the operation stop or stopping signal, inputted to the reset terminal of the PWM circuit 25, to a high state H, to stop the switching element Q1 ON/OFF signal OUT1.

Figure 4:
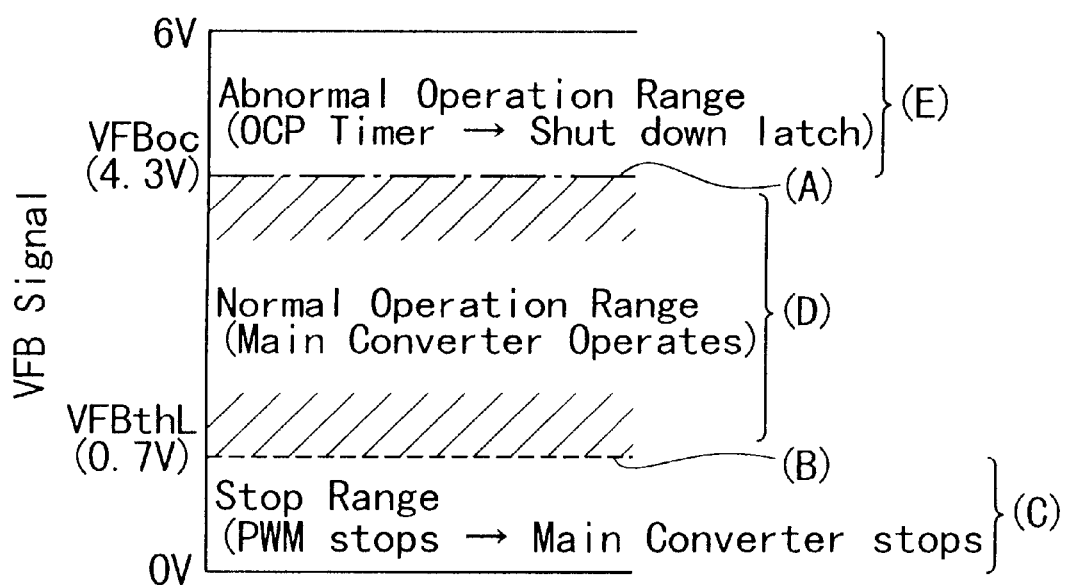
FIG. 4 is a drawing depicting operation of the embodiment of FIG. 1.

Operation of the embodiment of FIG. 3 will be described with reference to FIG. 4 which illustrates operation of the embodiment of FIG. 3 for a control stop signal STP and a primary shut-down signal S/D. In FIG. 4, item (A) shows a high threshold voltage VFBoc set for the feedback signal voltage VFB; and item (B) shows a low threshold voltage VFBthL. Accordingly, the feedback signal VFB can be divided into three regions by two threshold levels of high threshold voltage VFBoc and low threshold voltage VFBthL. These regions are called "Stop range" (C); "normal operation range" (D); and "abnormal operation range" (E); and in increasing order of voltage from the lowest level.

Operation of the embodiment in a "normal operation range" (D) is described with reference to the waveform chart of FIG. 5, wherein line 103 represents the ON/OFF status of the remote control signal; line 104 represents the input voltage VFB and output voltage VFB of the photo-coupler PC; line 105 represents the driving signal OUT2 of switching element Q1 outputted from driver 17; line 106 represents the charging voltage for timer capacitor 22; and line 107 represents the main output voltage Vo. The auxiliary converter output of line 102 is always produced regardless of the ON or OFF state of the remote control signal and as long as the commercial line voltage 101 is applied. It is assumed in this case that auxiliary converter 40 is already started up after commercial line voltage 101 is turned ON and PWM circuit 25, driving voltage Vcc1, and secondary control voltage Vcc2, are supplied in a stable manner.

When main converter 10 is operating normally, the feedback signal VFB lies in the "normal operation range" (D). PWM circuit 25 controls the pulse width of the switching element Q1 according to the value of feedback signal VFB to maintain the output voltage constant (see period "a" in FIG. 5).

Operation of the embodiment in "stop range" (C) is described with reference to FIG. 5. When the remote control signal is turned OFF or over-voltage protection circuit 50 is operated, switch SW2, in the shut-down execution circuit 80, is turned ON and the input voltage of photo-coupler PC is changed to a low state L. Then, since the feedback signal VFB is decreased below the low threshold voltage VFBthL, the output signal STOP from the comparator 19 is changed to a high state H, and switching element Q1 ON/OFF signal OUT1 is outputted from the PWM circuit 25, is reset. This stops generation of output signal OUT2 from driver 17 and thus stops operation of the main converter 10 (see period "b" in FIG. 5). After that, when feedback signal VFB is returned to a value which is higher than the low threshold voltage VFBthL, main converter 10 is restarted in operation (see period "c" in FIG. 5). In addition, when feedback voltage VFB is deflected to be lower and beyond the "stop range" due to the failure of the photo-coupler PC, or the like, operation of the main converter 10, can also be stopped by action similar to that described (see period "d" in FIG. 5).

Furthermore, operation of the embodiment in "abnormal operation range" (E) is described with reference to FIG. 5. When feedback voltage VFB is deflected to be higher and into the "abnormal operation range" due to the failure of the photo-coupler PC or the like, that is, when feedback signal VFB exceeds the high threshold voltage VFBoc, the output signal OCP from the comparator 20 is changed to a high state H and timer latch circuit 21 causes charge timer capacitor 22 to be started. When, the voltage across timer capacitor 22 exceeds a specified value, the primary shut-down signal S/D is outputted as a latch signal and holds PWM circuit 25 in a stopped state (see period "e" in FIG. 5). Accordingly, destruction of the load circuit due to over-voltage, can be prevented.

In addition, the following function is also effective as a protection circuit for output short-circuit or over current when this is combined with current limiting circuit 24. Current limiting circuit 24 detects the current flowing in main converter 10 by use of detection resistor 26 and outputs current limiting signal CL to PWM circuit 25 when the current goes into an over-current state. This signal narrows the pulse width of the ON/OFF signal OUT1, for switching element Q1, outputted from the PWM circuit 25 and the output voltage of main converter 10 gradually falls (see period "f" in FIG. 5). When this state continues, the output from secondary error amplifier 20 is deflected to the higher side following an operation similar to the foregoing, and timer latch circuit 21, is operated, and then the main converter 10 is shut down (see period "e" in FIG. 5).

In the invention, it is possible that feedback signal VFB will fall below the low threshold voltage VFBthL when switch SW1 in power ON/OFF circuit 60 is turned OFF, and output signal STP from comparator 19 is changed to a high state H, and timer latch circuit 21 is reset. Hence, it becomes possible to restart operation of the main converter 10 by turning ON switch SW1 after removing the causes of over-current. Capacitor 22 serves as a stabilized timer, making it possible to supply power in a stable manner without shutting down the switching power supply even when feedback signal VFB is deflected to a higher side for a short period of time in a transient response, start-up, etc, of the switching power supply.

The foregoing description is merely illustrative for the purpose of showing a specific preferred embodiment of the invention. Hence, the invention is not restricted to the foregoing embodiment and can further include many changes and modifications in the range without departing from the spirit and essential character thereof.

As is apparent from the foregoing description, the embodiment of FIG. 3 can realize control of the main output voltage from the secondary circuit, startup and shutdown of the main converter, and the overcurrent protection operation and its release using only a single isolation element. Moreover, since the switching power supply can be rapidly stopped even when the isolation element fails, it is possible to realize with the invention a highly reliable, compact switching power supply that can be manufactured using fewer components.

Moreover, advantageously, the switching power supply of the invention, once shut down, can be restarted using the primary input voltage. This is because the switching power supply has a feature wherein the operation stop signal latched by the primary control circuit can be readily and easily reset by the remote control circuit in the secondary circuit.

Furthermore, advantageously, the switching power supply of the invention comprises a primary control circuit which comprises easily and readily obtainable general purpose components so that manufacturing is accomplished at low cost. Also, it is possible to further reduce cost and space by producing the primary control circuit and the secondary circuit using ASICs.

What is claimed is:

1. In a switching power supply comprising:

a main converter means (10) for turning ON and OFF DC current applied to a primary winding (n1) of a main transformer (T1) with a main switching element (Q1) and for outputting a main power voltage to a secondary circuit by rectifying and smoothing current induced in a secondary winding (n2) of said main transformer;

an error amplifier means (2) for generating an error voltage between said main power voltage and a first reference voltage (Vref1);

a PWM circuit means (25) for outputting a driving signal for said main switching element so as to lessen error voltage by said error amplifier means;

a photo-coupler means (PC) for receiving said error voltage outputted from said error amplifier means as an input signal and for outputting said error voltage to said PWM circuit means (25);

an over-voltage protection circuit means (50) for generating an over-voltage signal when said main power voltage outputted to said secondary circuit exceeds a second reference voltage (Vref2);

a power ON/OFF circuit means (60) for outputting either a high level potential or a common potential depending on a remote control signal specifying power ON/OFF;

a shut-down latch circuit means (70) for outputting a shut-down signal from an output terminal in response to said over-voltage signal; and a shut-down execution circuit means (80) for holding an input voltage of said photo-coupler means at a voltage for suppressing photo coupler lighting when either said remote control signal specifies power OFF, or said shut-down signal is enabled; the improvement comprising a primary control circuit means comprising:

means for outputting an operation stop signal from said PWM circuit means (25) to said main switching element (Q1) of said main converter means (10) when a feedback signal (VFB) from said photo-coupler means (PC) is lower than a low threshold voltage (VFBthL) thereby to cause stopping of operation of said main converter means (10);

means responsive to return of said feedback signal (VFB) to a value which is larger than said low threshold voltage (VFBthL) for causing restarting of operation of said main converter means (10); and means responsive to said feedback signal (VFB) becoming larger than a high threshold voltage (VFBoc) and latching of said PWM circuit means (25) in a stopped state for causing abnormal operation of said main converter means (10) to cease.

2. The power supply of claim 1, wherein said primary control circuit means comprises means for latching said operation stop signal so as to be reset by turning OFF said remote control signal.

3. The power supply of claim 1, wherein said primary control circuit means comprises:

a comparator means (19) comprising a positive terminal, a negative terminal, and an output terminal;

means for applying said low threshold voltage (VFBthL) to said positive terminal;

means for applying said feedback voltage signal (VFB) to said negative terminal; and means for providing a control stop signal (STP) from said output terminal.

4. The power supply of claim 1, wherein said primary control circuit means comprises:

a comparator means (20) comprising a positive terminal, a negative terminal, and an output terminal;

means for applying said high threshold voltage (VFBoc) to said negative terminal;

means for applying said feedback voltage signal (VFB) to said positive terminal; and means for providing an anomaly stopping signal (OCP) from said output terminal.

5. The power supply of claim 1, wherein said primary control circuit means comprises:

a timer latch circuit means (21) comprising a set terminal, a reset terminal, and an output terminal;

means for applying an anomaly stopping signal (OCP) to said set terminal;

means for applying a control stop signal (STP) to said reset terminal;

means for providing a primary shut-down signal (S/D) from said output terminal when said anomaly stopping signal (OCP) continues to be applied for a definite amount of time; and means for resetting said primary shut-down signal (S/D) when said control stop signal (STP) is applied.

6. The power supply of claim 1, wherein said primary control circuit means comprises:

current limiting circuit means (24) comprising:

means for detecting a DC current applied to said primary winding (n1) of said main transformer (t1), and means for outputting a current limiting signal (CL) when said DC current exceeds a predetermined value.

7. The power supply of claim 1, wherein said primary control circuit means comprises:

an OR circuit means (23);

means for applying a control stop signal (STP), a primary shut-down signal (S/D), and a current limiting signal (CL) to said OR circuit means (23); and means for applying an output signal from said OR circuit means (23) to said PWM circuit means (25) as said operation stop signal.

* * * * *